(No Model.) 6 Sheets—Sheet 1.
R. WALLWORK.
MECHANISM FOR TESTING YARNS AND THREADS.

No. 379,088. Patented Mar. 6, 1888.

Attest:-
N. E. Poulter
C. M. Gallaher

Inventor,
Roughsedge Wallwork,
per Henry Orth
his atty (No Model.) 6 Sheets—Sheet 2.
R. WALLWORK.
MECHANISM FOR TESTING YARNS AND THREADS.

No. 379,088. Patented Mar. 6, 1888.

(No Model.) 6 Sheets—Sheet 3.

R. WALLWORK.
MECHANISM FOR TESTING YARNS AND THREADS.

No. 379,088. Patented Mar. 6, 1888.

Fig. 3.

Attest
W. P. Poutter
C. M. Gallaher

Inventor
Roughedge Wallwork,
per Henry Orth
his atty.

(No Model.) 6 Sheets—Sheet 4.
R. WALLWORK.
MECHANISM FOR TESTING YARNS AND THREADS.
No. 379,088. Patented Mar. 6, 1888.

UNITED STATES PATENT OFFICE.

ROUGHSEDGE WALLWORK, OF MANCHESTER, COUNTY OF LANCASTER, ENGLAND, ASSIGNOR TO JAMES WHALEY SHEPHERD AND WILLIAM AYRTON, OF SAME PLACE.

MECHANISM FOR TESTING YARNS OR THREADS.

SPECIFICATION forming part of Letters Patent No. 379,088, dated March 6, 1888.

Application filed May 19, 1887. Serial No. 238,748. (No model.) Patented in England July 24, 1885, No. 8,927.

*To all whom it may concern:*

Be it known that I, ROUGHSEDGE WALLWORK, a citizen of Great Britain, residing at Manchester, in the county of Lancaster and Kingdom of Great Britain, engineer, have invented certain new and useful Improvements in Mechanism for Testing Yarns or Threads; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Referring to the drawings.

The invention relates to a machine in which are combined mechanism for winding, measuring, and weighing yarn or thread, for ascertaining the uniformity of the same, for testing both the tensile as well as the breaking strength of a single yarn or thread or of a plurality or hank of such, and means for ascertaining the twist in a given length of yarn or thread.

The invention consists in the combination, construction, and co operation of mechanisms whereby the above results are obtained, substantially as hereinafter fully described, and as set forth in the claims.

Figure 15:
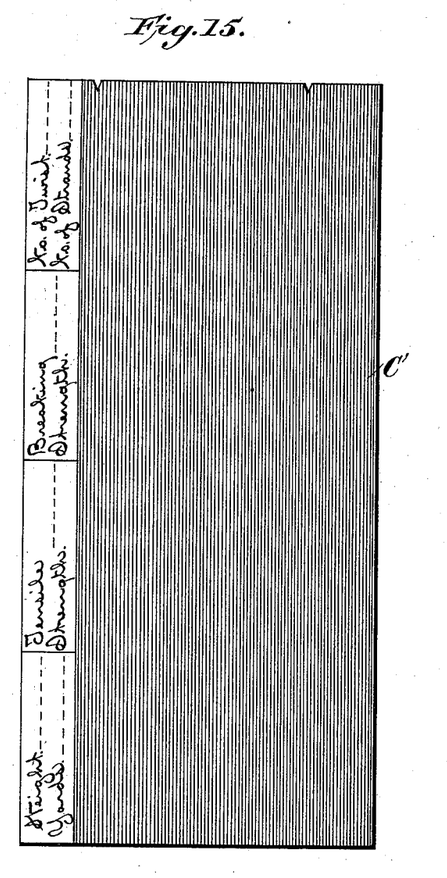
Fig. 15 is a plan view of the card C'.

In combination with my improved machine I employ a thin card or plate, C', of any suitable material—metal, card-board, wood, or other suitable material—upon which the yarn or thread is wound. These cards are preferably made of a color contrasting with the color of the yarn or thread wound thereon. For instance, for white yarn or thread I employ, preferably, a black card; for dark yarn or thread, a white card or a card of other contrasting color. By this means defects in the yarn or thread can be readily detected. The cards are also, preferably, provided with indices denoting the number of yards of yarn or thread wound thereon, as well as the weight, tensile and breaking strength, number of twist, and number of strands, or any one or more of these, as may be found desirable. These indices are preferably arranged along one of the lateral edges of the card, as shown in Fig. 15, and when dark or black cards are employed these are provided with a suitable strip of white paper pasted along said edge; or the indices may be printed or written on a label and said label affixed to the card in any convenient manner. I propose to make these cards C' of a predetermined length, so that the number of convolutions or laps will give the length of yarn or thread wound thereon and so that its "counts" can be readily found by weighing. For instance, the card may be made three-eighths of a yard long, so that one hundred and sixty laps wound thereon will equal one "ley" or "rap," or the seventh part of a "hank."

In winding, the thread or yarn is wound to leave a space between them for all or any desired portion of the width of the card, the contrast in the color of the latter and the yarn or thread enabling the operator to readily detect any defects or want of uniformity, since the threads forming the laps are side by side and can readily be compared.

In the drawings, $b$ indicates the base or supporting plate of the apparatus, to which is secured a standard, A, provided with a top plate or table, A', from whose right end project two arms, $a'$ $a'$, in which are formed the bearings for a shaft, S. The shaft S carries a crank-handle, S', at one end, a stepped cord or belt pulley, P', and a cross-head, C, at the other end, and between its bearings a worm, W. The cross-head C has secured thereto a number of pairs of spring-arms, $c$, on opposite sides of a central groove, $c'$, and between said arms is held the card C', hereinabove referred to, upon which the yarn or thread is wound. At its left end the table A' is provided with arms $a^2$ $a^2$, in which are formed bearings for a shaft, S$^2$, and at their outer ends said arms $a^2$ unite and form a sleeve, $s^2$, rectangular in cross-section, for purposes hereinafter described.

A portion of the shaft S$^2$ is screw-threaded, as at $s^3$, and carries a stepped cord or belt pulley, P$^2$, the pulleys P' and P$^2$ facing in reverse directions, and are connected by a belt or cord, $c^2$. Between its bearings the shaft S$^2$ also carries a worm, W$^2$, and its end opposite to the screw-threaded portion is constructed to form a thread-clamp, S$^3$, the jaws whereof are adjusted by means of a set-screw, $s^4$.

The table A' is further provided with a slotted arm, $a$, that projects from its front edge, for the reception of a graduated bar, B, for purposes hereinafter described.

In the upper face of the table A' are formed two socket-bearings, $a^3$ $a^4$, for the spindle $d$ of a graduated disk, D, whose periphery is toothed and may be made to mesh either with the worm W or the worm W$^2$ by inserting its spindle $d$ into the bearing $a^3$ or $a^4$, for purposes presently explained.

Figures 4, 7, 8:
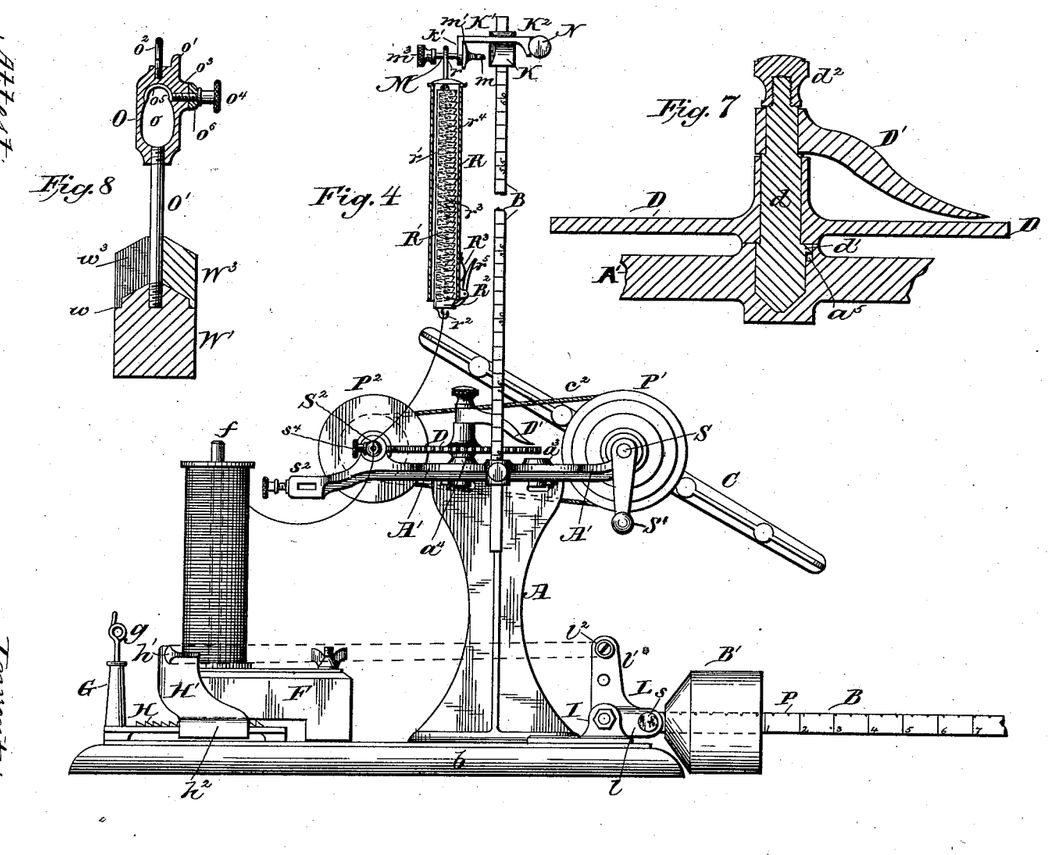
Fig. 4 is a front elevation of the apparatus, showing the parts in the position for testing the breaking strength of a single yarn or thread wound on a spool.
Fig. 7 is a vertical axial section of the graduated index-wheel and its pointer and a portion of the top or table of the supporting-standard.
Fig. 8 is a vertical section of the weighted nut or support and its threaded bearing for testing the elasticity of yarn or thread and for traversing the yarn or thread on the card in winding.

The toothed and graduated disk or wheel D is loosely mounted on the spindle $d$, while the latter is held against rotation in its bearings by a feather or key, $d'$, entering into a vertical groove, $a^5$, formed in each bearing $a^3$ $a^4$, as shown in Fig. 7. Upon the spindle $d$, above the graduated wheel D, is loosely mounted a pointer, D', said pointer remaining stationary while the wheel revolves that portion of the spindle $d$ upon which the pointer D' is seated being of less diameter than that portion upon which the wheel is seated. A set-screw, $d^2$, holds the pointer to its seat, as shown in Fig. 7.

Although it is preferred to mount the wheel D loosely on the spindle, it is obvious that it may be rigidly connected thereto without rotating the pointer D', as is well understood.

The wheel D has one hundred and sixty teeth and revolves a distance of one tooth at each complete revolution of either the worm W or W$^2$, and the face of the plate has an equal number of subdivisions from 1 to 160 or from 0 to 159. This subdivision refers, of course, only to such cards as are of the length hereinbefore given, and may be varied at will or to suit any desired length of card C', so that the pointer will indicate the number of convolutions or laps wound on each card, consequently the number of yards of yarn or thread wound thereon, the cards being provided with thread-notches to secure the ends of the yarn or thread.

O indicates a weighted nut, in which is formed a vertical slot, $o$, of greater diameter than that of the screw-threaded portion of the shaft S$^2$, except at the upper end of said slot, which is semi-cylindrical and screw-threaded to fit the thread on the shaft, as at $o^5$, Fig. 8. Although this construction is not absolutely necessary, as it is obvious that the nut may have the usual screw-threaded bore to fit the threaded portion of the shaft S$^2$, yet I prefer it, as the nut and its weight may be moved from one end of the shaft to the other, or removed therefrom without rotating said shaft in the proper direction, which will be necessary when the nut has simply a threaded perforation and acts as a nut. From the upper face of the nut projects a flange, $o'$, that forms a thread-guide and a thread eye or hook, $o^2$, and on one of its lateral faces is formed a shoulder, $o^3$, that, together with the clamping-screw $o^4$ and a washer, $o^6$, forms a thread-clamp. A rod, O', connected with the nut carries a weight, W', that has preferably a conical upper end of less diameter than the body of the weight, to form a seat, $w$, for an additional weight or weights, W$^3$, having a corresponding recess formed in their under side, and are provided with a vertical slot, $w^3$, so as to more readily apply them to the weight W, as more plainly shown in Fig. 8. This weighted nut O is placed and travels on the shaft S$^2$ when the latter is rotated, for purposes hereinafter described.

Upon the base plate $b$ of the apparatus is pivoted a bracket, F, that has a vertical spindle, $f$, for supporting a bobbin, and in its rear side one or more holes, $f^2$, for a cop-spindle, $f'$; and G is a standard that carries at its upper end a thread-curl, $g$, said standard being secured to the rear corner at the left end of the base $b$. The bracket F is pivoted to the base $b$, so that it may be adjusted to bring the nose of the cop on a line with the thread-curl $g$, as shown in Figs. 1, 2, 3, and 5.

To the base $b$, at the left front corner, is secured a rack or toothed plate, H, upon which is fitted a bracket, H', that has an arm, $h'$, for securing one end of the loop of yarn or thread, and has one or two teeth, $h$, at its right-hand end that engage the teeth of the toothed plate or rack H, so that said bracket may be adjusted on the rack, and when adjusted held against motion from left to right.

Figures 5, 9, 10, 11:
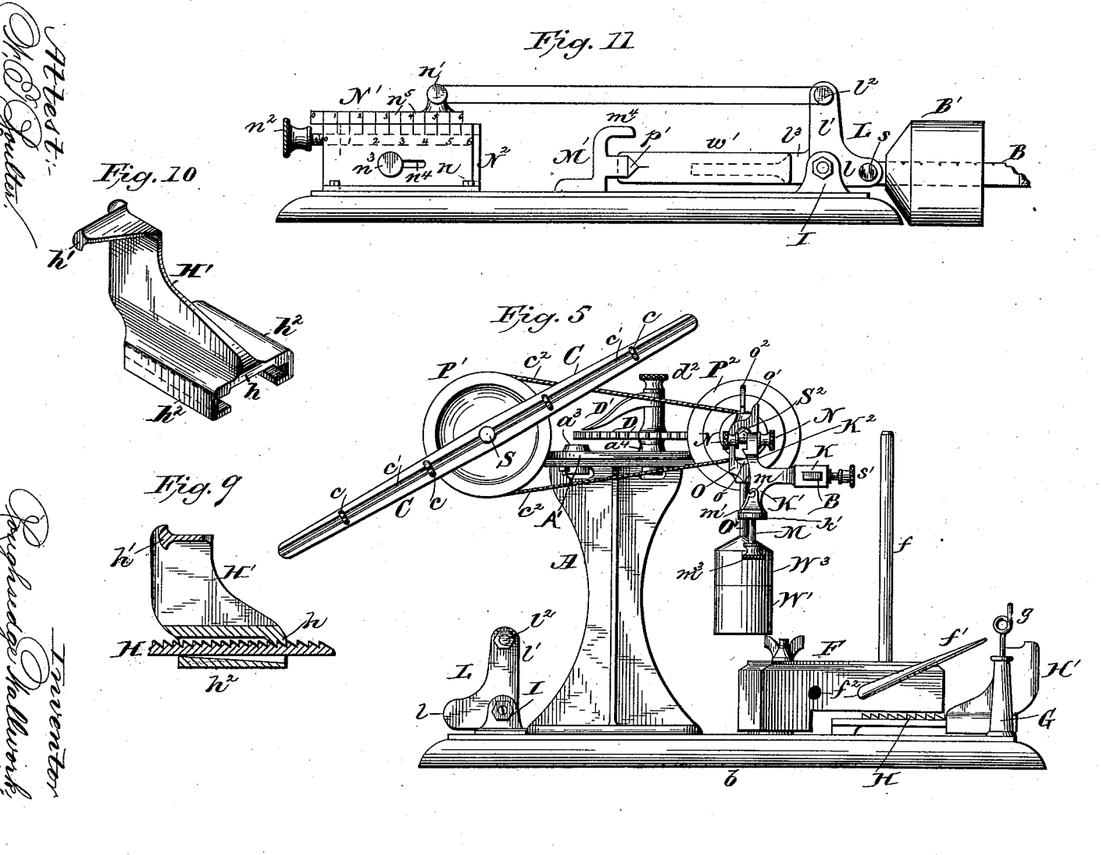
Fig. 5 is a rear elevation thereof, the parts being in the position indicated in Fig. 2.
Fig. 9 is a vertical longitudinal section of the adjustable yarn or thread holder employed for testing the breaking strength of a number of threads or a hank, a portion of the toothed plate or rack being broken away.
Fig. 10 is an isometric view of the bracket of the adjustable yarn or thread holder shown in Fig. 9.
Fig. 11 is a side elevation illustrating a modified construction of devices for testing the breaking strength of a plurality of threads.

The foot $h^2$ of the bracket H' has grooved sides that embrace the lateral edges of the rack H, and said grooves are of gradually-increasing vertical diameter or height from the left to the right of said foot $h^2$, so that the left end of the bracket may be lifted sufficiently to lift its tooth $h$ out of the teeth of the rack H to slide the bracket in one or the other direction in adjusting the same, as shown in Fig. 9.

Figure 6:
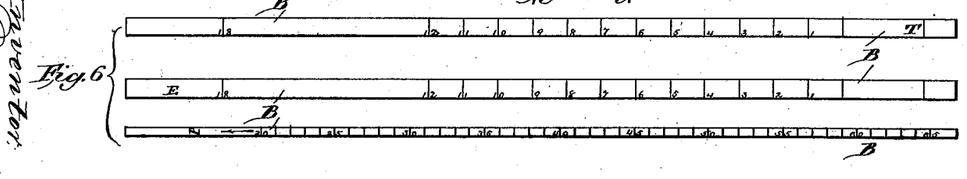
Fig. 6 shows the bar B by an edge view and opposite side elevations respectively.

I indicates a bearing at the right front corner of the base $b$, in which bearing is journaled an angle-lever, L, whose arm $l$ has a rectangular socket for the reception of the bar B, that serves, in conjunction with the lever, as a weight-beam in testing the breaking strength of a plurality of threads or of a hank, the grooved weight B' being movable along the beam or bar B, the latter being secured in its socket by means of a set-screw, $s$. The bar B also serves for other purposes, hereinafter described, and is preferably made of steel, may be about twenty-four inches long, and may be provided with indices on three of its sides. One of these indices may be marked E, to show that it is to be used for testing the elasticity; the other may be marked T, to show that it is to be used for ascertaining the amount of twist in a given length of yarn or thread, and the third side may be marked P, and may be used as a scale-beam in testing the breaking strength of a number of threads or a hank. The faces E and T are graduated to inches and fractions and the face P to pounds and fractions, as shown in Fig. 6.

From the arm $l'$ of lever L projects a stud, $l^2$, to which one end of the loop of thread or yarn is secured, the other end being secured to the arm $h'$ of bracket H', as above mentioned.

K indicates a bracket provided with a rectangular slot for the passage of the graduated bar B, the bracket being secured on the bar by means of a set-screw, $s'$. The bracket K has two arms, K' and K². The arm K' has a bearing, $k'$, at right angles, in which slides freely a rod, M, that has a heavy head, $m'$, acting as a weight, and is provided with a hook, $m$, at one end and a nut, $m^3$, at the other. The arm K² has flat sides and a screw-threaded opening, in which works a double-headed screw, N, and co-operates with the flat sides of the arm K² to clamp the yarn or thread.

Figure 1:
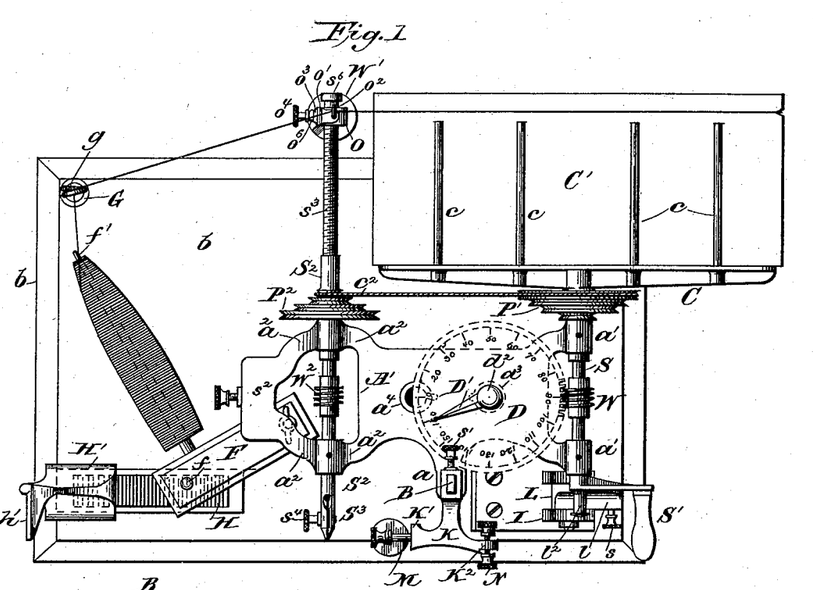
Figures 1, 2, and 3 are top plan views of the apparatus, respectively showing, first, the various devices in their position for winding the yarn or thread, ascertaining the number of laps wound, weighing the yarn or thread, and testing the breaking strength of a single yarn or thread; second, for testing the elasticity of the yarn or thread, and, third, ascertaining the number of twist thereof, devices for testing the breaking strength of a plurality of yarns or threads or a hank being shown in all these figures.

The operation of the mechanism above described is as follows, referring more particularly to Fig. 1. In winding and measuring yarn or thread and ascertaining the uniformity thereof the bar B, with its bracket K, is placed in the slot of the projecting arm $a$ of the table A' to get it out of the way or to place it in position for weighing. The toothed and graduated disk or wheel is stepped in the bearing $a^3$, so as to mesh with the worm W, the pointer D' being moved to the zero or 360 graduation on the wheel D. Before commencing the winding the nut O is moved to the end of the shaft S², said nut serving to traverse the yarn or thread on the card, and is returned into this position each time it reaches the limit of its movement on said shaft. A bobbin is placed on the spindle or rod $f$ of bracket F, if the thread or yarn is to be reeled off a bobbin, or the spindle $f'$ of a cop, if the yarn or thread is to be reeled off such, is stuck in one of the holes $f^2$ of the bracket, which is rotated on its pivot to bring the yarn or thread on a line with the curl $g$ on the standard G. The yarn or thread is then passed through the curl $g$, thence over the thread-guide $o'$, and through the curl or eye $o^2$ of the weighted nut O on shaft S². After passing through the eye $o^2$ the end of the yarn or thread is secured in the proper thread-notch in card C' of the desired color and the shaft S is revolved, thereby revolving the shaft S² and traversing the nut thereon. A lap or turn is wound on the card at each complete revolution of the shaft, the wheel D advancing simultaneously a distance of one tooth; hence when the zero-graduation again reaches the pointer one hundred and sixty turns or laps will be wound on the card, which will be equal to one ley or rap, or the seventh part of a hank. The first laps may be wound sufficiently apart to enable the operator to detect at once any defects in the yarn or thread, as above referred to. To effect this the shaft S is rotated rapidly, and this may be done by changing the belt or cord $c^2$ on the step-pulleys P' P² accordingly.

When the object is simply to obtain a given length, the yarn or thread may be wound close, and may, when the card is full, be weighed either with said card or separately. In the former case the weight of the card is first ascertained and deducted from the gross weight, when the counts or number of hanks to the pound weight may readily be calculated. The weighing is done in the scales (Salter's balance) suspended from the hooked rod M.

When it is desired to ascertain the amount of twist in a given length of yarn or thread, I proceed as follows, referring to Fig. 3: The bar B is secured in the sleeve $s^2$ of the table A' and adjusted to the desired length of thread to be tested, the bracket K being secured to the end of the bar, so as to stand at the zero-graduation on the twist-index T. One end of the thread is secured in the clamp S³ on the end of shaft S², and the other end of said thread is passed through the hook $m$ of the weighted rod M, said thread being first passed over the clamping-screw N. The weight of rod M will stretch the yarn or thread, which is then clamped to the bracket-arm by the screw N. The pointer D' on the index-wheel D is then turned to the zero-graduation, and the shaft S is rotated in the proper direction, thereby rotating the shaft S² and index-wheel D to untwist the yarn or thread, and when all the twist is taken out the wheel D will show the number of twists there was in the length of thread operated upon.

Figure 3:
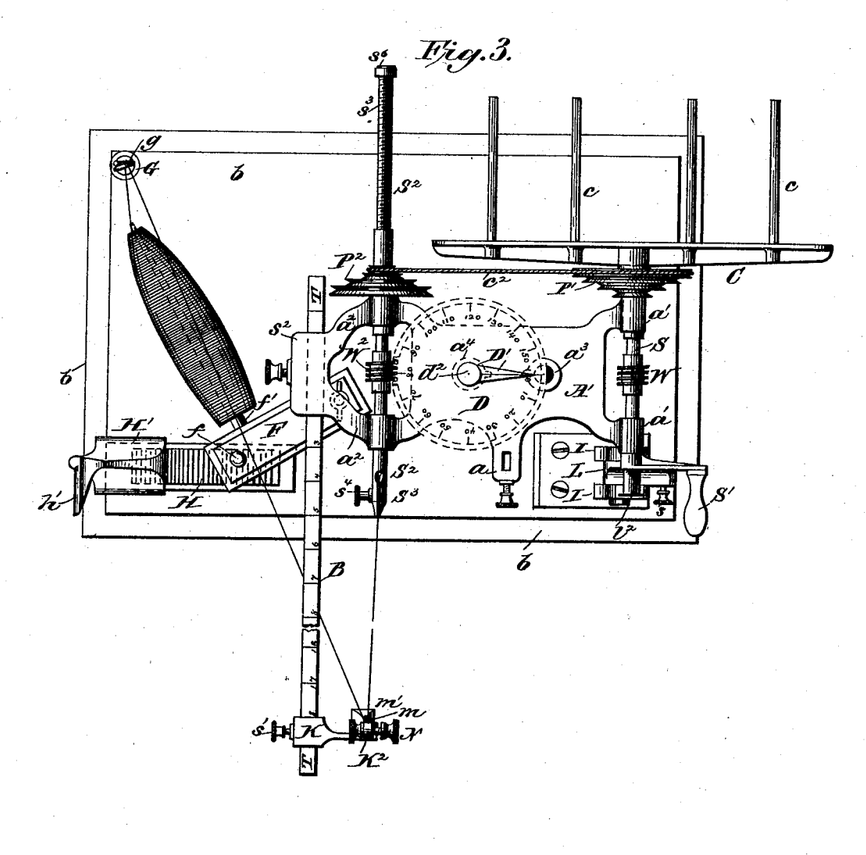

To avoid any error in counting by reason of the slipping of the driving band or cord $c^2$, the wheel D is placed in the bearing $a^4$, so as to mesh with the worm $W^2$ on the shaft $S^2$, as shown in said Fig. 3. By this arrangement the number of revolutions of the shaft $S^2$ is accurately indicated by the index-wheel D irrespective of the variations in the tension of the belt, cord, or band $c^2$.

Figures 2, 12, 13, 14:
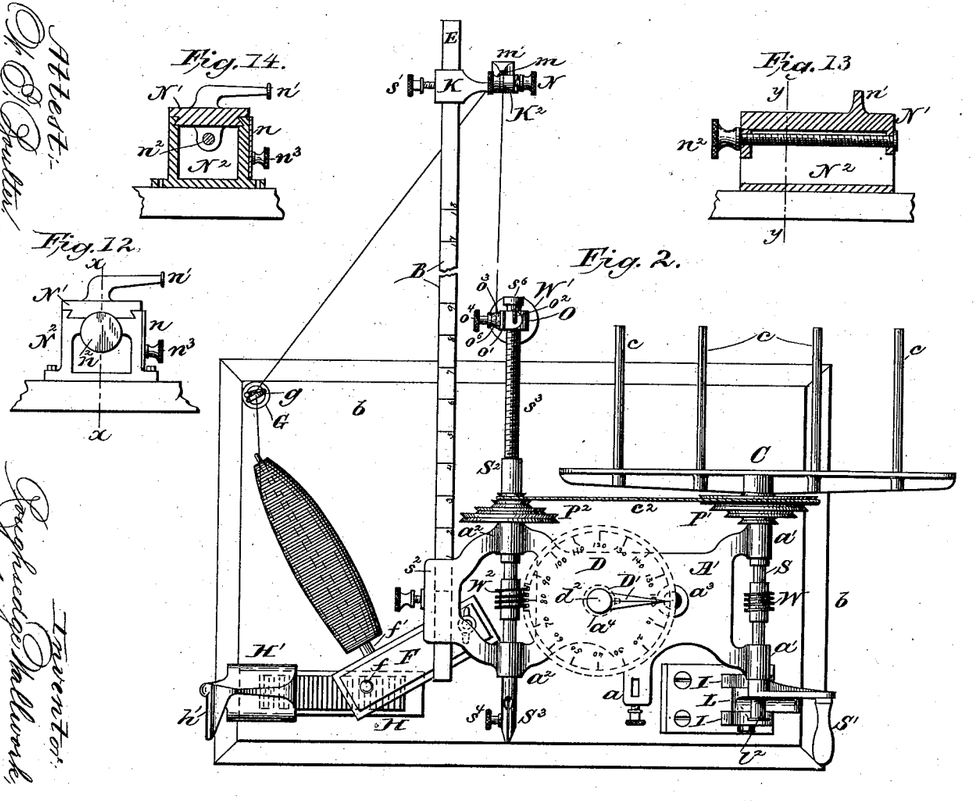
Fig. 12 is a left-end elevation of the same.
Figs. 13 and 14 are sections taken, respectively, on lines $xx$ and $yy$ of Figs. 12 and 13.

Referring more particularly to Figs. 2 and 5, if it is desired to test the elasticity of yarn or thread, the bar B is reversed to bring the graduated face E on top and moved out in sleeve $s^2$, along the threaded end of shaft $S^2$, with the bracket K secured thereto, as shown. The end of the yarn or thread is hooked to the hook $m$ on the weighted rod M. The yarn or thread is then passed over the screw N, between one of its shoulders and one of the flat faces of the arm $K^2$ of bracket K. From thence the yarn or thread is passed to the thread-clamp $o^3$ $o^4$ of the weighted nut O; but before the yarn or thread is clamped the nut is moved to the outer end of the shaft $S^2$, against the shoulder or head $s^6$ thereof, and the bar B is adjusted to the desired length of thread between the clamp $o^3$ $o^4$ and the clamping screw N of the bracket K. The weighted hooked rod M $m$ stretches the thread or yarn, which is then clamped fast by the clamping-screw $o^4$. The shaft S is now rotated, thereby rotating the shaft $S^2$ and the index-wheel D, which has previously been set into the bearing $a^4$ of table A', in gear with the worm $W^2$.

By means of the weighted hook M $m$ the tension upon each section of thread tested will be made uniform before each test begins. The pitch of the screw-thread of the threaded portion of the shaft $S^2$ is preferably made equal to sixteen turns to the inch of its length, so that every complete revolution of the said shaft and every corresponding rotation of a distance of one tooth of the index-wheel D will indicate a stretch of one-sixteenth of an inch, and the index will thus show how many sixteenths of an inch the yarn or thread has stretched before it breaks, as the screw is turned until, and is stopped when, the yarn or thread breaks.

The rod O' of the nut O should be weighted to such an extent that the yarn or thread tested will not hold it against motion on the shaft $S^2$, but that said thread will break after being stretched to the full extent.

Referring to Fig. 4, if it is desired to ascertain the strength of yarns or threads, the bar B is secured in the slotted arm $a$ of the table A' in a vertical position, with the bracket K at its upper end. From the rod M is suspended a spring-balance, consisting of a ring, $r$, connected with one end of a tubular casing, R, containing a tubular stem, R', that slides freely in said casing, and in which stem is arranged the scale-spring. The lower end of the spring $r'$ is attached to the corresponding end of the stem R', and the upper end of said spring is attached to the corresponding end of the casing R, as is usual in spring-balances. The stem or rod R' has at its lower end a hook, $r^2$, and the sides of said stem or rod are provided with a scale of weights, $r^3$, indicating the weight required to compress the spring, as usual. The rod has also fine ratchet-teeth $r^4$, corresponding with the graduations of the scale of weights thereon.

Upon the case R is pivoted a pawl, $R^2$, actuated by a spring, $R^3$, to maintain said pawl in engagement with the teeth on the rod R', so as to hold the latter against the stress of the spring when drawn out of the case by the strain exerted thereon by the yarn or thread to be tested or by the weight of the yarn or card weighed. By pressing upon the arm $r^5$ of the pawl it is disengaged from the ratchet-teeth of the rod R', and is withdrawn into the case R by its spring $r'$ to its zero-mark.

One end of the thread or yarn whose strength is to be tested is secured to the hook $r^2$ of the rod R, and then clamped between the jaws $S^3$ at the outer end of the shaft $S^2$. The latter shaft is then rotated so as to wind the thread thereon and draw the rod R' out of its case against the stress of its spring $r'$ until said yarn or thread breaks, when the breaking strength in pounds or fractions, or both, may be read off the graduations of said rod, which will be held in its position by the pawl $R^2$; or, if desired, the thread or yarn before being clamped to the shaft $S^2$ may be taken down to the base $b$ under a pin, pulley, or roller, (not shown in the drawings,) and thence up to the shaft $S^2$, to which the other end of the thread is clamped. A number of such tests may be made—as, for instance, ten—upon the same kind of yarn or thread, and these added together and the average strength of the yarn or thread obtained by dividing the sum of the tests by ten.

This scale may also be used for weighing the thread or yarn wound on the cards or after removal from the cards, as above mentioned. When a plurality of yarns or threads or a hank are or is to be tested, the desired number of laps is wound upon a card C', then removed in a hank form, and one end of the loop of the hank or partial hank is placed upon the stud or pin $l^2$, projecting from the angle-lever L. The other end of the loop is placed upon the arm $h'$, projecting laterally from the bracket H', as shown in Fig. 4. To the arm of the lever L, which lever is pivoted on cone-centers in the bracket I, is secured the bar B, the weight B' being set to the zero-mark of the weight-graduations P thereof, and the bracket H' is adjusted on the rack H, so that said bar will be held in a horizontal position, thereby stretching the hank under a uniform initial strain. The weight B' is then gradually moved along the bar B, and as the hank stretches the bracket is adjusted to maintain the bar in a nearly horizontal position by moving said bracket to the left on the rack H, this being continued until the hank breaks, the weight indicating the breaking strain in pounds and fractions on the bar B.

By means of the described arrangement of the devices for ascertaining the breaking strength of a plurality of yarns or threads, or a hank of such, the tests can all be commenced under a uniform initial strain. This initial strain may be varied as desired. For instance, the initial strain of, say, ten pounds, may be exerted upon the hank at the commencement of each test, or any other round weight less than that required for breaking the loop of yarn or threads may be adopted.

In view of the described construction of the bracket H', it will be readily understood that the greater the strain on the yarn or thread the more securely will the tooth of the bracket be locked to the teeth of the rack H.

In Figs. 11, 12, 13, and 14 I have shown a modification of the devices for testing the breaking strength of a plurality of threads in the form of a loop or hank, and at the same time ascertaining the elasticity of the yarn or thread. In these figures the lever L is shown as provided with a third weighted arm, $l^3$, or on which arm a weight, $w'$, is placed to counterbalance the bar $h$ and weight B', when the latter is at the zero-indication on the bar. A bracket, M', provided with a pointer, $p'$, is secured to the base $b$ at the left of the arm $l^3$, and the weight $w'$ has a mark which serves to indicate the horizontality of the bar B. At its upper end the bracket M' has an overhanging ledge, $m^4$, that serves to limit the upward motion of the weight $w'$, consequently the downward motion of the bar B when the yarn or thread breaks. In this arrangement, instead of the rack H and bracket H', I employ a slide or carriage, N', provided with a laterally-projecting arm, $n'$, to which one end of the loop of yarns or threads is connected, said carriage traveling on a suitable guideway, $N^2$, at the left end of which is formed a screw-threaded bearing in which works a screw, $n^2$, whose end is secured to the carriage N', as more plainly shown in Fig. 13. The carriage or slide N' has graduations $n^5$ on its front edge, indicating inches and fractions, and to the front face of the guide $N^2$ is adjustably secured a correspondingly-graduated plate, $n$, the adjustment thereof being effected by means of the set-screw $n^3$, passing through a longitudinal slot, $n^4$, in the plate $n$. In testing a plurality of threads or a hank the several tests should be made under a uniform initial strain, as above described, and during the test the bar B should be maintained as nearly as possible in a horizontal position.

Inasmuch as there is generally a slight variation in the length of the hanks, it is necessary that the plate $n$ should be adjustable to bring its zero-mark to a mark of initial strain on the slide N'.

The initial strain is that which holds the weight-bar B, with its weight B', in a horizontal position, and the said strain is applied by moving the slide N' toward the left by manipulating the screw until the bar B is held in a horizontal position, and may represent, as stated above, ten pounds.

As shown in Fig. 11, the slide N' has been moved to the left in order to give to the yarn the slight initial strain, and the plate $n$ has been adjusted to bring its zero graduation opposite one of the graduations on the slide as a starting-point. In this case the zero-mark on the plate stands at the half-inch mark on the slide. If the weight B' is now slowly moved out on the bar B and the screw $n^2$ is simultaneously rotated to maintain the yarn or thread at the necessary tension to keep the bar horizontal until the yarn or thread breaks, then the distance traveled by the slide will be indicated on the plate $n$ by the half-inch graduations. Thus if the slide has been adjusted before the breaking of the yarn or thread, so that when said yarn or thread breaks the four-inch graduation thereon stands opposite the zero-graduation on the plate $n$, it will indicate that the hank had stretched three and a half inches before breaking, so that both the elasticity as well as the tensile strength of the yarn or thread will be indicated.

It will be observed that in all tests the yarn or thread or the hank is first subjected to an initial strain, which must be the same for all tests of the same kind of yarn or thread. In the case of single threads this is effected by the weighted hook-rod M, and in the case of a plurality of threads by the slides, in conjunction with the weight beam or bar B.

Instead of driving the shafts S and $S^2$ by cord or belt, they may be driven by gearing, and in this case a differential gear may be employed to drive the shaft S at a greater speed than the shaft $S^2$, for the purpose of simply winding and measuring yarn or thread.

Having described my invention, what I claim is—

1. In a machine of the class described, mechanism for winding thread or yarn, comprising a winding-shaft carrying the device on which the yarn or thread is wound, and a measuring-wheel operated from said shaft and indicating the revolutions thereof, in combination with mechanism for traversing the thread, comprising a screw-threaded shaft revolving in unison with the winding-shaft, and a nut fitted on said shaft and provided with a thread-guide, substantially as and for the purpose specified.

2. In a machine of the class described, mechanism for winding thread or yarn, comprising a winding-shaft carrying the device on which the thread or yarn is wound, a measuring-wheel operated from said shaft and indicating the revolutions thereof, and a traversing device for traversing the yarn or thread as it is wound, in combination with a stationary thread-guide and an adjustable cop or bobbin holder, substantially as and for the purpose specified.

3. In a machine of the class described, mechanism for winding the thread or yarn, comprising a winding shaft carrying the device on which the thread or yarn is wound, a measuring-wheel operated from the shaft and indicating the revolutions thereof, and mechanism for traversing the thread or yarn as it is wound, comprising a screw-threaded shaft revolving in unison with the winding-shaft, and a nut fitted on said shaft and provided with a thread-guide, in combination with a stationary thread-guide and an adjustable cop or bobbin holder, substantially as described, for the purpose specified.

4. In a machine of the class described, mechanism for winding the thread or yarn, comprising a winding-shaft carrying the device on which the thread or yarn is wound, and a measuring-wheel operated from the shaft and indicating the revolutions thereof, in combination with mechanism for traversing the thread as it is being wound, comprising a weighted nut provided with an elongated slot screw-threaded at its upper end to fit the thread of the shaft, and a thread-guide connected with the nut, substantially as and for the purposes specified.

5. In a machine of the class described, mechanism for winding the thread or yarn on a card or plate, comprising a revoluble shaft, a card or plate holder secured thereto, and a measuring-wheel operated from the shaft and indicating the revolutions thereof, in combination with mechanism for traversing the yarn or thread, consisting of a screw-threaded shaft operated from the winding-shaft, and a nut fitted on said shaft and provided with a thread-guide, substantially as and for the purpose specified.

6. In a machine of the class described, the mechanism for testing the breaking strength of yarn or thread, comprising a shaft provided at one end with a thread-clamp for clamping one end of the yarn or thread, and an index operated from said shaft, indicating the revolutions thereof, in combination with a support for said shaft, provided with a vertically-slotted bearing, a vertical bar graduated to inches and fractions, adjustable vertically in said bearings, a bracket adjustable vertically on the bar, and a spring-scales provided with means for attaching the other end of the yarn or thread thereto, substantially as and for the purposes specified.

7. In a machine of the class described, mechanism for testing the breaking strength of yarn or thread, comprising a shaft provided at one end with a thread-clamp for clamping one end of the yarn or thread, and an index operated from said shaft indicating the revolutions thereof, in combination with a support for said shaft, provided with a vertically-slotted bearing, a vertical bar graduated to inches and fractions, adjustable vertically in said bearing, a bracket adjustable vertically on the bar and provided with a thread-clamp, and a hooked weight movable vertically in said bracket, whereby the yarn or thread tested may be subjected to a uniform initial strain previous to being clamped to the bracket and previous to ascertaining the breaking strain thereof, as described.

8. In a machine of the class described, mechanism for ascertaining the number of twist in a given length of yarn or thread, comprising a revoluble shaft provided at one end with a thread-clamp, and an index operated from the shaft to indicate the number of revolutions thereof, in combination with a support for said shaft, a horizontally-slotted bearing parallel to the shaft, a horizontal bar adjustable in said bearing and graduated to inches and fractions, a bracket adjustable on the horizontal bar, and a thread-clamp on said bracket, substantially as and for the purpose specified.

9. In a machine of the class described, mechanism for ascertaining the number of twist in a given length of yarn or thread, comprising a revoluble shaft provided at one end with a thread-clamp, and an index operated from the shaft to indicate the number of revolutions thereof, in combination with a support for said shaft, a horizontally-slotted bearing parallel to the shaft, a horizontal bar adjustable in said bearing and graduated to inches and fractions, a bracket adjustable on the horizontal bar, a thread-clamp on said bracket, and a hooked weight movable vertically on the bracket, whereby the yarn or thread tested may first be subjected to an initial strain after having been clamped to the shaft and before being clamped to the bracket, substantially as and for the purpose specified.

10. In a machine of the class described, mechanism for ascertaining the breaking strength of a single length of yarn or thread, comprising a screw-threaded revoluble shaft, a weighted nut mounted thereon and provided with means for securing one end of the yarn or thread thereto, and an index operated from the shaft to indicate the revolutions thereof, in combination with a support for the said devices provided with a horizontally-slotted bearing, a horizontal bar graduated to inches and fractions adjustable in said bearing, and a bracket adjustable on the bar and provided with means for securing the other end of the yarn or thread thereto, substantially as and for the purposes specified.

11. In a machine of the class described, mechanism for ascertaining the breaking strength of a single length of yarn or thread, comprising a screw-threaded revoluble shaft, a weighted nut mounted thereon and provided with means for securing one end of the yarn or thread thereto, and an index operated from the shaft to indicate the revolutions thereof, in combination with a support for the said devices provided with a horizontally-slotted bearing, a horizontal bar graduated to inches and fractions adjustable in said bearing, a bracket adjustable on the bar and provided with means for securing the other end of the yarn or thread thereto, and a hooked weight movable vertically in the bracket, whereby the yarn or thread tested may be subjected to a given initial strain by the weight after securing said yarn or thread to the nut and prior to securing the same to the clamp, substantially as described, for the purpose specified.

12. In a machine of the class described, the combination, with a winding-shaft, a screw-threaded shaft provided at one end with a thread-clamp, a support provided with bearings for said shafts, and an index-wheel operated from the screw-threaded shaft to indicate the revolutions thereof, of a graduated bar adjustable on the support relatively to said shafts, and a thread-retaining device adjustable on the bar, substantially as and for the purpose specified.

13. In a machine of the class described, the combination, with a revoluble shaft provided at one end with a thread-clamp for clamping one end of a thread thereto, and an index-wheel operated from and indicating the revolutions of said shaft, of a graduated bar adjustable in a plane at right angles to the shaft, and a spring-balance adjustably connected with the bar, the stem of said balance being provided with means for attaching the other end of the thread, whereby the tensile strength of a thread may be ascertained through the medium of the index-wheel, and the breaking strength in pounds and fractions through the medium of the spring-balance, substantially as described.

14. In a machine of the class described, the combination, with a revoluble shaft provided at one end with a thread-clamp for clamping one end of a thread thereto, and an index-wheel operated from and indicating the revolutions of said shaft, of a graduated bar adjustable in a plane at right angles to the shaft, a spring-balance adjustably connected with the bar, the stem of said balance being provided with means for attaching the other end of the thread, said stem being provided with toothed graduations, and a spring-pawl adapted to engage the teeth of said stem to hold it against the stress of its spring, substantially as and for the purpose specified.

15. In a machine of the class described, devices for ascertaining the breaking strength of a plurality of threads or a hank of such, comprising a pivoted lever provided with a stud for securing one end of the loop of threads, a weigh-beam secured to the lever, a weight movable on said lever, a carriage or slide provided with a stud or arm for securing the other end of the loop of threads, and a guide on which the carriage is adjustable toward and from the lever, substantially as and for the purpose specified.

16. In a machine of the class described, devices for ascertaining the breaking strength of a plurality of threads or a hank of such, comprising a pivoted lever provided with a stud for securing one end of the loop of threads, a weigh-beam secured to the lever, a weight movable on said lever, a carriage or slide provided with a stud or arm for securing the other end of the loop of threads and with graduations on one of its lateral faces, a guide on which the carriage is adapted to move, and a stationary adjustable and graduated plate secured to the guide and having graduations corresponding with those on the carriage, substantially as and for the purpose specified.

17. The combination of the stationary guide $N^2$, the carriage $N'$, movable thereon and provided with graduations $n^5$, and an arm, $n'$, and the three-armed lever L, provided with the stud $l^2$, and weighted arm $L^3$, in combination with the bracket $M'$, the bar B, and weight $B'$, said devices being arranged and operating substantially as and for the purposes specified.

18. The combination, with the support $A'$, having slotted bearings $a\ s^2$, the shafts $S\ S^2$, carrying each a worm, and the index-wheel D and its pointer $p$, of the bar B, having graduations E T on two of its faces, substantially as and for the purpose specified.

19. The combination, with the support $A'$, having slotted bearings $a$, $a^3$, $a^4$, and $s^2$, the shafts $S\ S^2$, geared together, each carrying a worm, the index-wheel D, its pointer $D'$, bracket K, and lever L, of the bar B, having graduations E T P and adapted to co-operate with either shaft and the index, or with the lever L, substantially as and for the purpose specified.

In testimony whereof I affix my signature in presence of two witnesses.

ROUGHSEDGE WALLWORK.

Witnesses:
PETER J. LIVSEY,
JAMES WOOD.